United States Patent
Sakita et al.

(10) Patent No.: US 9,247,111 B2
(45) Date of Patent: Jan. 26, 2016

(54) IMAGING DEVICE USING AN OPTICAL PHASE FILTER THAT MODUATES A OPTICAL TRANSFER FUNCTION OF AN OPTICAL IMAGE OF AN OBJECT

(71) Applicant: Hitachi, Ltd., Tokyo (JP)

(72) Inventors: Koichi Sakita, Tokyo (JP); Takeshi Shimano, Tokyo (JP); Mitsuhiko Ota, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/142,032

(22) Filed: Dec. 27, 2013

(65) Prior Publication Data

US 2014/0184859 A1  Jul. 3, 2014

(30) Foreign Application Priority Data

Dec. 28, 2012 (JP) ................................. 2012-286632

(51) Int. Cl.
| | |
|---|---|
| *H04N 5/217* | (2011.01) |
| *G02B 27/00* | (2006.01) |
| *H04N 5/225* | (2006.01) |
| *H04N 5/232* | (2006.01) |

(52) U.S. Cl.
CPC ............ *H04N 5/217* (2013.01); *G02B 27/0068* (2013.01); *H04N 5/2254* (2013.01); *H04N 5/23212* (2013.01)

(58) Field of Classification Search
CPC ............ H04N 5/23212; H04N 5/2254; H04N 21/4318; G02B 27/0025; G02B 27/068
USPC ............................ 348/342, 335; 359/637, 279
See application file for complete search history.

(56) References Cited

U.S. PATENT DOCUMENTS

| | | | |
|---|---|---|---|
| 5,748,371 A | 5/1998 | Cathey, Jr. et al. | |
| 5,834,761 A * | 11/1998 | Okada et al. | 348/342 |
| 8,294,764 B2 * | 10/2012 | Mathieu | 359/365 |
| 2004/0228005 A1 * | 11/2004 | Dowski, Jr. | 359/671 |
| 2011/0017827 A1 * | 1/2011 | Hayashi et al. | 348/345 |
| 2012/0162486 A1 * | 6/2012 | Asakura et al. | 348/222.1 |

* cited by examiner

*Primary Examiner* — Nhan T Tran
(74) *Attorney, Agent, or Firm* — Volpe and Koenig, P.C.

(57) ABSTRACT

An imaging device includes an imaging element, a phase plate to modulate the optical transmission function of the optical image of the object, and an optical system for focusing the optical image modulated via the optical plate on the imaging surface of the imaging element, a spatial filter processing unit for image restoration processing to remove modulation by an optical phase filter by implementing two-dimensional spatial filtering processing on the image focused on the imaging surface of the imaging element. Modulation characteristics applied to the optical system by the phase plate are respectively different in the horizontal and vertical directions crossing at right angles along the flat surface of the imaging surface perpendicular to the optical axis.

6 Claims, 8 Drawing Sheets

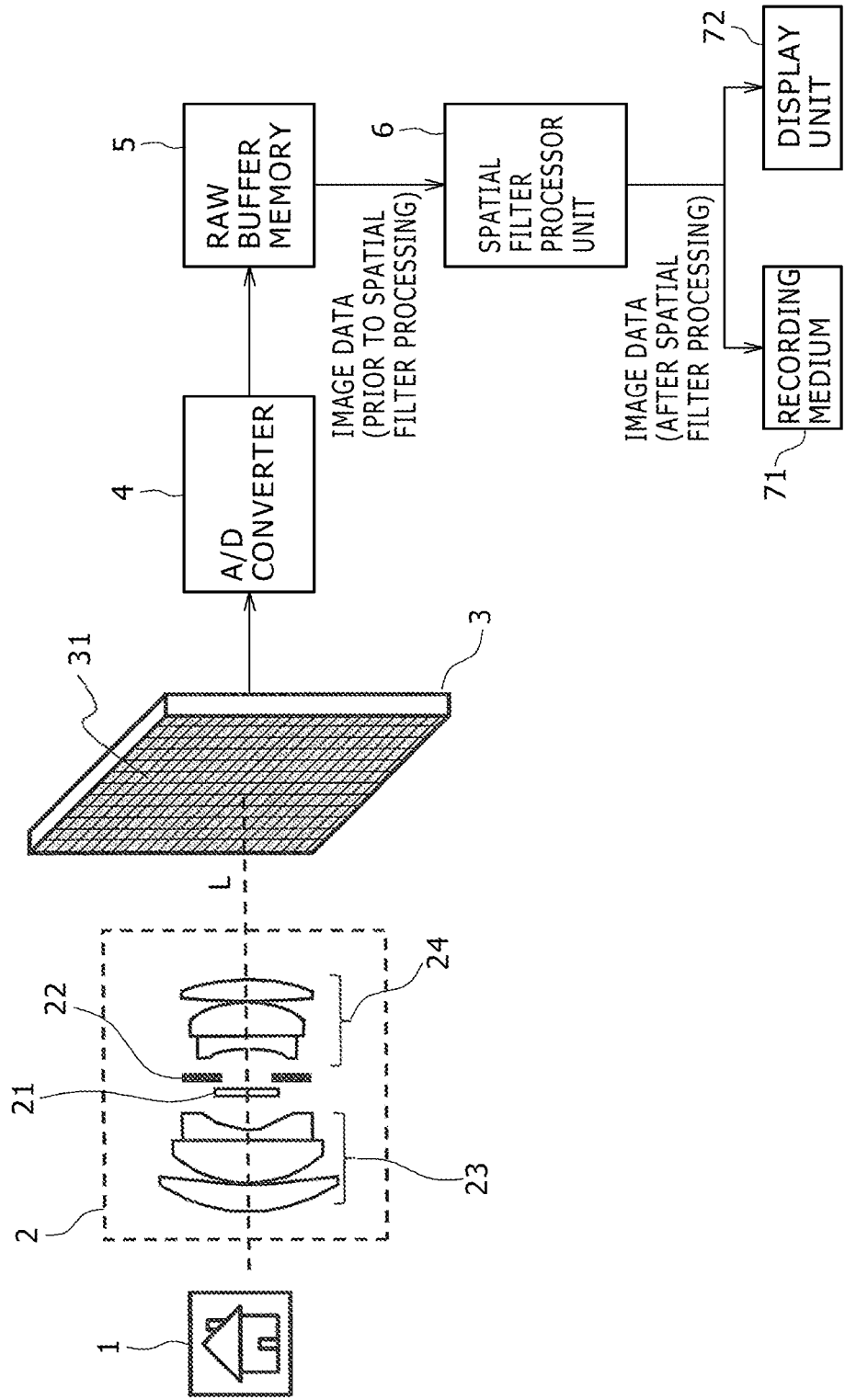

FIG.2A
FIG.2B
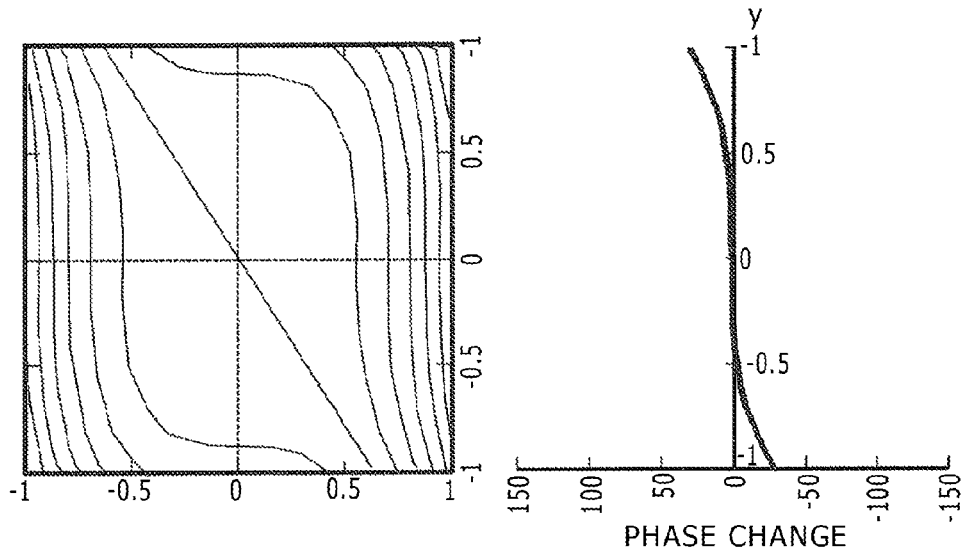
FIG.2C
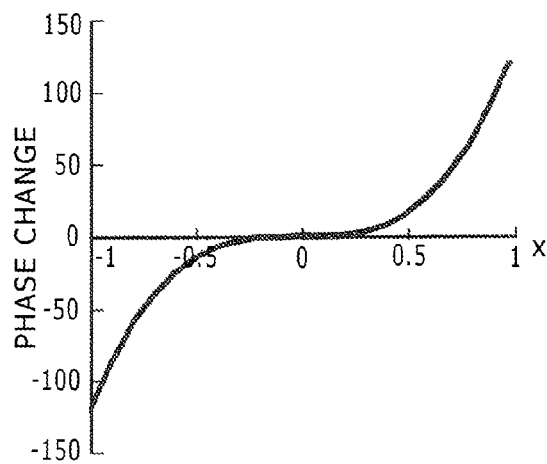

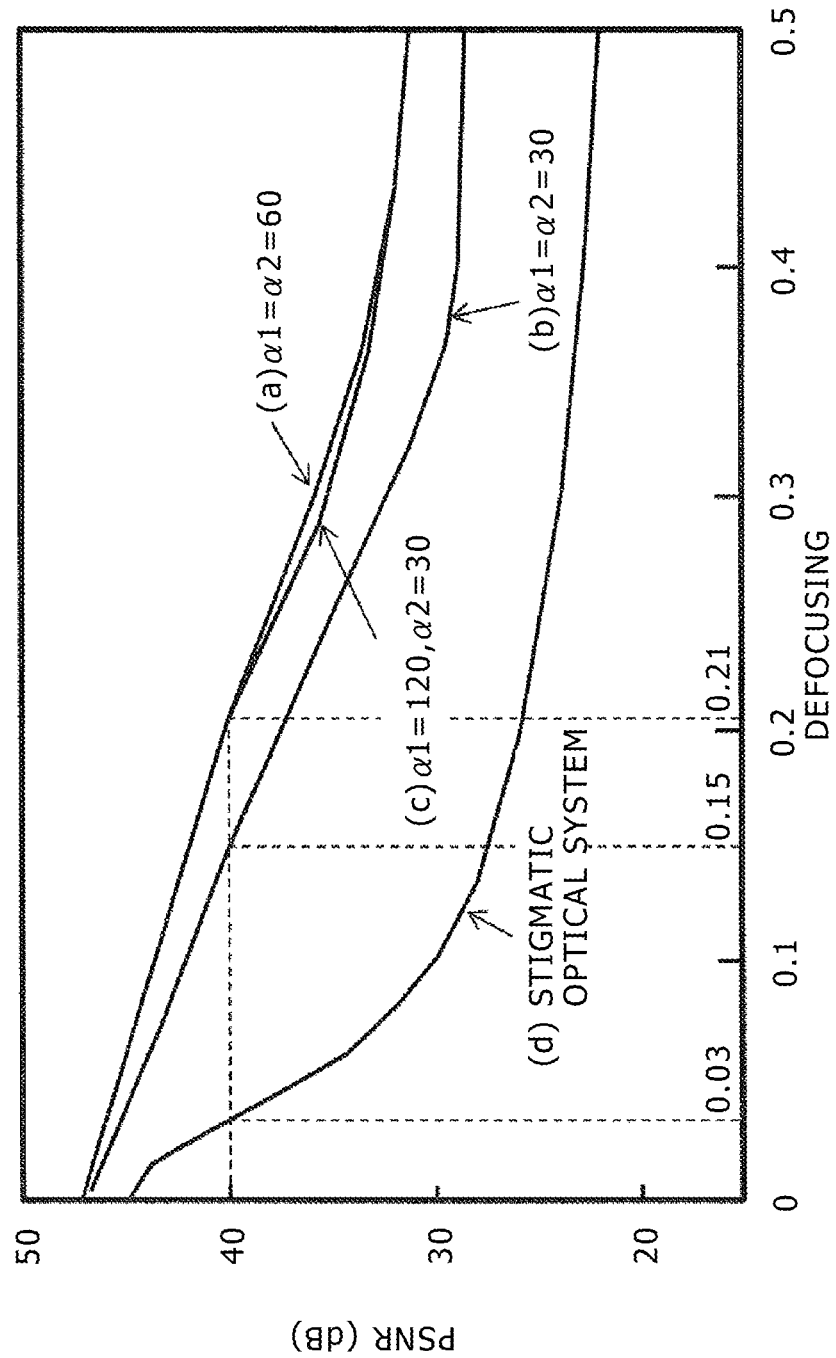

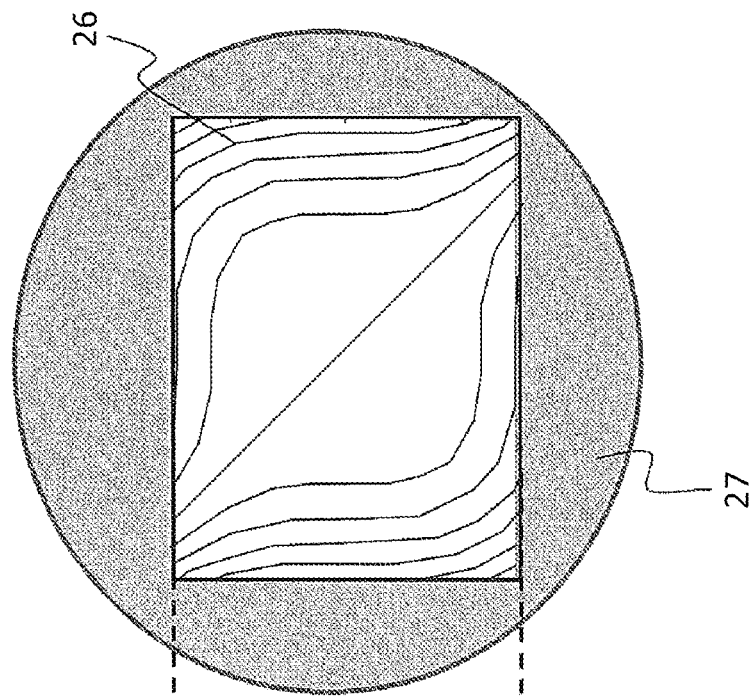
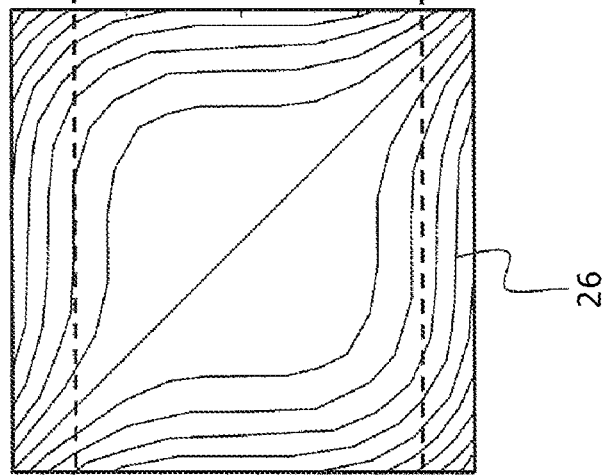
FIG. 6A
FIG. 6B

IMAGING DEVICE USING AN OPTICAL PHASE FILTER THAT MODUATES A OPTICAL TRANSFER FUNCTION OF AN OPTICAL IMAGE OF AN OBJECT

CROSS-REFERENCE TO RELATED APPLICATION

This application claims the priority of Japanese Patent Application No. 2012-286632 filed Dec. 28, 2012, which is incorporated herein by reference in its entirety.

BACKGROUND

The present invention relates to an imaging device for modulating the optical transfer function of the optical image by way of an optical phase filter to increase the depth of focus and to obtain a sharp image by removing the modulation component through image processing.

A known background technology for the technical field is disclosed for example in U.S. Pat. No. 5,748,371. The U.S. Pat. No. 5,748,371 discloses a technology in which an optical mask that modulates the optical phase is mounted in the optical system and is designed to make the OTF (Optical Transfer Function) essentially constant within a certain distance range from the focused focal point position in order to increase the depth of field, and further in which signal processing is performed on the modulated intermediate image subjected to modulation from the OTF by the optical mask to remove the modulation effects caused by the optical mask, and in this way increase the depth of field.

SUMMARY

In the above example of the related art technology, two-dimensional spatial filtering process for example is utilized as image processing (hereafter also sometimes called "image restoration process") to remove optical modulated components by the optical phase filter such as an optical mask, or namely to restore an image made fuzzy by optical phase filtering, back into a sharp image. The two-dimensional spatial filtering process utilized here includes the so-called convolutional arithmetic process that multiplies the coefficients separately set according to each pixel position for pixels within a specified horizontal range and vertical range including the pixel targeted for filter processing, and mutually sums them. The above two-dimensional spatial filtering process is for example implemented as follows. First of all, an image data captured by an imaging element modulated via an optical phase filter is stored in a shift register. Among the horizontal image data, those pixels within the specified horizontal range are sequentially stored in the shift register. These pixels are respectively multiplied by the coefficients corresponding to each horizontal position within the relevant horizontal range and then mutually summed. Horizontal filter processing is performed in this way. The image data processed by the horizontal filter is respectively stored in line memories equal in number to the spatial filter size in the vertical direction (namely the specified vertical range). Data is stored in all of the line memories and at the point in time when valid, the coefficients corresponding to each vertical position in the specified vertical range relative to the output from the line memory are multiplied and summed. Vertical filter processing is performed in this way.

One line portion of image data or equivalent storage capacity is required in one line memory in order to implement two-dimensional spatial filtering process, and line memories must be equal in number to the spatial filter size in the vertical direction. Therefore in terms of circuit scale, the filter size is preferably reduced in the vertical direction rather than the horizontal direction to lower the number of line memories.

In the U.S. Pat. No. 5,748,371 however, an optical mask having cubic function characteristics is utilized so that the optical transfer function within a range on the optical axis at a certain distance from the focused focal point position can be rendered insensitive, however the intermediate image that is obtained is a fuzzy image spanning a wide pixel range in the image. The size of the spatial filter utilized in the image restoration process therefore becomes extremely large. When designed so that the optical modulation characteristics due to the optical mask are the same in both the horizontal and vertical directions, a large number of line memories are required at this time for vertical filter processing. The related art technology therefore has the problems of a large cost and large circuit scale for the image processing circuit for carrying out image restoration process such as the two-dimensional spatial filtering process.

The two-dimensional spatial filtering process performs convolutional arithmetic processing on pixels within a range for example of ±20 to 50 in both the horizontal and vertical directions based on the target pixel here, the pixels in the convolutional arithmetic processing range are the same in the horizontal and vertical directions. Therefore, when performing two-dimensional spatial filtering process on a certain single pixel, the convolutional arithmetic processing is performed on several hundred to thousands of pixels in the periphery of that pixel so a huge amount of processing time is required. The technology of the related art can therefore only be applied to still images, and cannot therefore be utilized for capturing moving images.

In view of the aforementioned issues of the related art, the present invention has the object of providing an imaging device with a structure capable of increasing the depth of focus by modulating the optical image and removing the modulation by image restoration process, to reduce the circuit scale required for image restoration process and permit capture of moving images.

To address the aforementioned issues, the present invention utilizes a structure as described in the claims. In one aspect of that structure, an imaging device includes an imaging element including an imaging surface, an optical system including an optical phase filter for modulating the optical transfer function of the optical image of the object, to focus the optical image modulated by the optical phase filter onto the imaging surface of the imaging element, and a signal processing unit to implement two-dimensional spatial filtering process on the image focused on the imaging surface of the imaging element and the implement image restoration process to remove the modulation by the optical phase filter; and in which the modulation characteristics applied to the optical image by the optical phase filter are respectively different in the two horizontal and vertical directions mutually intersecting on the flat imaging surface perpendicular to the optical axis.

The optical phase filter may be configured from phase plates whose horizontal wavefront aberration and vertical wavefront aberration are different; or may be configured from phase plates whose horizontal wavefront aberration and vertical wavefront aberration are approximately the same, and a diaphragm whose horizontal aperture dimension is larger than the vertical aperture dimension.

The present invention is capable of applying different optical transfer characteristics in the horizontal and the vertical directions of the captured optical image and changing the horizontal and vertical size of the spatial filter utilized in the image restoration process while reducing the amount of performance deterioration in the image restoration process such as the two-dimensional spatial filtering process. The number of line memories within the circuits required for spatial filter processing can in this way be reduced and the circuit scale of the image processing lowered. The present invention can therefore provide an imaging device at a reduced cost. The present invention can also be utilized as an imaging device for capturing moving images that is designed to be capable of increasing the depth of focus by modulating the optical image, and removing the effects of modulation from the image restoration process.

The issues, composition, and effects other than described above will become more readily apparent in the description of the embodiments.

BRIEF DESCRIPTION OF THE DRAWINGS

FIG. 1 is a drawing showing one example of the structure of the imaging device of the first embodiment of the present invention;

FIGS. 2A, 2B, and 2C are drawings showing an example of phase plate in the first embodiment of the present invention;

FIG. 5 is a graph showing simulation results for the depth of focus expansion effect of the first embodiment;

FIGS. 6A and 6B are drawings showing the second embodiment of the present invention;

DETAILED DESCRIPTION

Figure 3:
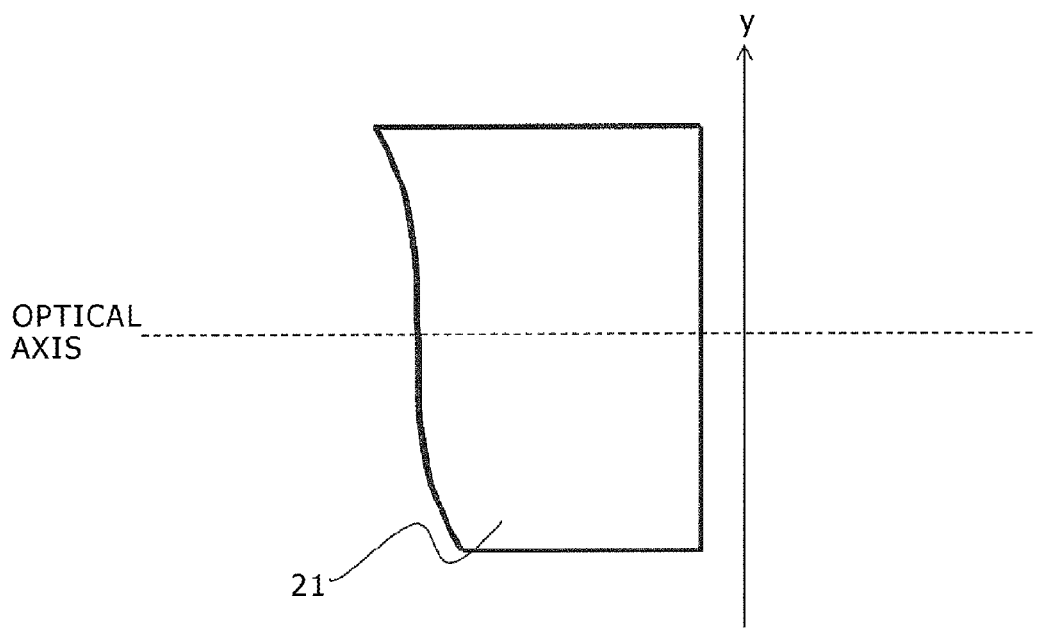
FIG. 3 is a drawing showing a cross sectional shape of the phase plate of the first embodiment.

The embodiments of the present invention are described next while referring to the accompanying drawings. Elements having the same functions and same parts are assigned the same reference numerals and redundant descriptions are omitted.

First Embodiment

An example of the structure of the imaging device of the first embodiment of the present invention is described first of all while referring to FIG. 1. The imaging device of the present embodiment can be utilized for example in AV cameras, cellular phone cameras, portable information terminal cameras, image inspection cameras, and industrial cameras for automatic control use, etc.

The imaging element 3 captures the optical image of the object 1 that was input by way of the optical system 2. The optical system 2 here is an element for inputting the optical image of the object 1. The optical system 2 includes a front lens group 23 containing a plurality of lens elements mounted on the object 1 side, a rear lens group 24 containing a plurality of lens elements mounted on the imaging element 3 side, a diaphragm 22 having a rectangular (square shape) aperture or a circular aperture according to the optical system 2 mounted between the front lens group 23 and the rear lens group 24, and a phase plate 21 serving as an optical phase filter mounted on the front lens group 23 side in the vicinity of the diaphragm 22 to spatially modulate the optical image of the object 1 to apply the specified optical transfer function. This phase plate 21 is for example an optical component of transparent resin such as acrylic resin or polycarbonate. The optical characteristics of the phase plate 21 are described later on in detail.

The optical image of the object 1 acquired by way of the optical system 2 including the phase plate 21 is focused on and input to the imaging surface 31 of the imaging element 3. Here, the imaging element 3 is comprised of a CCD or CMOS sensor and inputs the image for example in periods of $1/60^{th}$ of a second or $1/30^{th}$ of a second. In other words, the imaging device of the present embodiment is suitable for capturing moving images.

The imaging element 3 converts the optical image focused and input to the imaging surface 31 of the imaging element 3, to an analog signal, and image data is then generated according to the optical image converted to a digital signal by the A/D converter 4.

The image data from the A/D converter 4 is stored in the RAW buffer memory 5 as an intermediate image. The spatial filter processor unit 6 functions as a signal processor for implementing two-dimensional spatial filtering process and loads (reads out) the image data stored in the RAW buffer memory 5.

In the spatial filter processor unit 6, two-dimensional spatial filtering process is implemented as image restoration process according to the optical transfer function determined by the optical modulation characteristics of the phase plate 21 contained within the optical system 2. In other words, image restoration process is implemented in the spatial filter processor unit 6 in order to correct the optical transfer function applied to the optical image by the phase plate 21. If the phase plate 21 for example applies an optical transfer function that makes the optical images of object 1 appear at a fixed fuzziness at each position within the specified range of distance on the optical axis L (e.g. dotted line L in FIG. 1), the spatial filter processor unit 6 can restore the optical image to a sharp image by removing the lack of focus by exaggerating or increasing and decreasing specified frequency components in the optical image having this type of optical transfer function.

To perform this type of two-dimensional filtering process, the spatial filter processor unit 6 includes a ROM (not shown in drawing) as a storage unit to store filter information such as preset spatial filter coefficients. The spatial filter processor unit 6 then loads (reads out) the filter information stored in this ROM and performs two-dimensional filtering process on the image data as image restoration process.

Other image processing units not shown in the drawing can also perform for example contrast adjustment, brightness adjustment, color (chrominance) adjustment, and also scaling processing such as enlargement or reduction, or frame rate conversion processing as needed on the image data that was output from the spatial filter processor unit 6. The image data subjected to this type of processing is recorded in the recording medium 71 and/or displayed on the display unit 72.

In imaging devices or imaging systems such as described above, the present embodiment is featured in utilizing the phase plate 21 contained within the optical system 2 to apply optical transfer functions that are respectively different in the horizontal direction and vertical direction, and moreover configures a spatial filter processor unit 6 corresponding to this optical transfer function. The implementation is described in detail as follows.

First of all, the phase plate 21 utilized in the imaging device of the present embodiment is described while referring to FIGS. 2A through FIG. 2C. FIG. 2A is a contour drawing of the wavefront aberration applied by the phase plate 21 of the optical phase filter in the present embodiment. The front surface of FIG. 2A is the object side and the rear surface is the imaging surface 31 side. FIG. 2B shows a cross section perpendicular to the x direction and parallel with the y direction of the phase plate 21 shown in FIG. 2A. FIG. 2C shows a cross section that is parallel with the x direction and crosses perpendicular to the y direction of the phase plate 21 shown in FIG. 2A. Here, the x in the figure indicates the horizontal direction along the imaging surface 31 perpendicular to the optical axis L of optical system 2; and the y indicates the vertical direction perpendicular to this horizontal direction x. As shown in FIGS. 2A through 2C, in the phase plate 21 of the present embodiment, the wavefront aberration in the vertical direction y is made smaller than the wavefront aberration in the horizontal direction x. Namely, in the phase plate 21 of the present embodiment, the phase change in the vertical direction is small relative to phase changes in the horizontal direction.

Here, when the refraction rate of the transparent resin material of the phase plate 21 is set as n, the surface shape of the phase plate 21 is expressed as a shape where the wavefront aberration is multiplied by $1/(n-1)$ so that the profile in the contour drawing in FIG. 2A is expressed unchanged as the surface shape of the phase plate 21. Accordingly, FIGS. 2B and 2C express the respective phase plate 21 cross sectional shape along the x direction and the cross sectional shape along the y direction. The cross sectional shape in the y direction and the cross sectional shape in the x direction of the phase plate 21 of the present embodiment are different from each other as shown in FIGS. 2B and 2C. For example, the shape at the right side edge in the x direction passing along the y direction center (0) of phase plate 21 is greatly protruding on the object side, and the shape at the left side edge is greatly falling on the imaging surface side of the imaging element 3. On the other hand, the shape at the upper side edge in the y direction along the x direction center (0) of the phase plate 21 is greatly protruding on the object side, and the shape at the bottom (lower) side edge is greatly reversing or falling on the imaging surface side, however the amount of protrusion to the object side or amount of drop on the imaging surface side are respectively smaller than the amount of protrusion on the right side edge and the amount of drop on the left side edge along the x direction.

The position where the luminous flux passing along the y direction line crosses the optical axis therefore becomes farther away (object side) than the position where the luminous flux passing along the x direction line crosses the optical axis in the phase plate 21. Consequently, the depth of focus in the x direction and depth of focus in the y direction are mutually different in the phase plate 21 of the present embodiment. Also, an optical transmission function (optical modulation) that generates mostly constant "fuzziness" within a specified distance range on the optical axis in the x direction is applied relative to the optical image of the object, however in the y direction this optical transfer function is not applied or the extent of optical modulation is reduced compared to the x direction.

FIG. 3 shows an overall cross sectional shape of the phase plate 21 of the present embodiment. FIG. 3 shows only a cross sectional view in the y direction. As can be seen in the drawing, the phase plate 21 has a specific thickness along the optical axis, and the surface on the object side has surface shape as shown in FIG. 2, and the surface on the focusing side is flat. The shape of the phase plate 21 is at most merely an example and is not limited to the shape shown in the drawing.

The surface shape (cross section) of the phase plate 21 is for example expressed by a cubic function. When the coefficients of this cubic function are set as α1, α2; and α1>α2, the phase plate 21 of the present embodiment is designed by calculating according to the following formula.

$$f(x,y) = \alpha 1 \cdot x^3 + \alpha 2 \cdot y^3 \quad \text{(Formula 1)}$$

The phase plate 21 can in this way be designed as shown in FIG. 2 so that the phase change in the vertical direction becomes small relative to the phase change in the horizontal direction.

Here, with the optical axis direction of phase plate 21 set as the z direction (direction perpendicular to paper surface in FIG. 2), and in an imaging surface as a flat plane perpendicular to the Z axis: a first direction corresponds to the x direction as the horizontal direction of the imaging element, and the second direction on the imaging surface crossing perpendicular to the first direction corresponds to the y direction as the vertical direction of the imaging element. The pupil shaped diaphragm 22 is set as a square shape, and the length of one side of this square shaped pupil is set as the standardized coordinates (x, y).

The values of the above coefficients α1 and α2 of the cubic function are respectively optimized to match the required depth of field and circuit scale. Here, however α1 is set to equal 120λ, and α2 is set to equal 30λ (λ is the center wavelength of the focused light) in order to match an actual example of the spatial filter processor unit and the focusing optical system shown later on.

The surface shape (cross section) of the phase plate 21 may be formed based on the following formula 2. In formula 2, the β1, β2 are respectively coefficients, and include the relation β1>β2.

$$f(x,y) = \alpha 1 \cdot x^3 + \alpha 2 \cdot y^3 + \beta 1 \cdot x + \beta \cdot y \quad \text{(Formula 2)}$$

In the present embodiment, a square pupil-shaped diaphragm having a square aperture serves as the diaphragm 22 however a circular pupil-shaped diaphragm having a circular aperture may also be employed. A rectangular aperture however is more preferable than a circular aperture as the diaphragm 22. The reason is described next while referring to FIG. 7 and FIG. 8.

Figure 7:
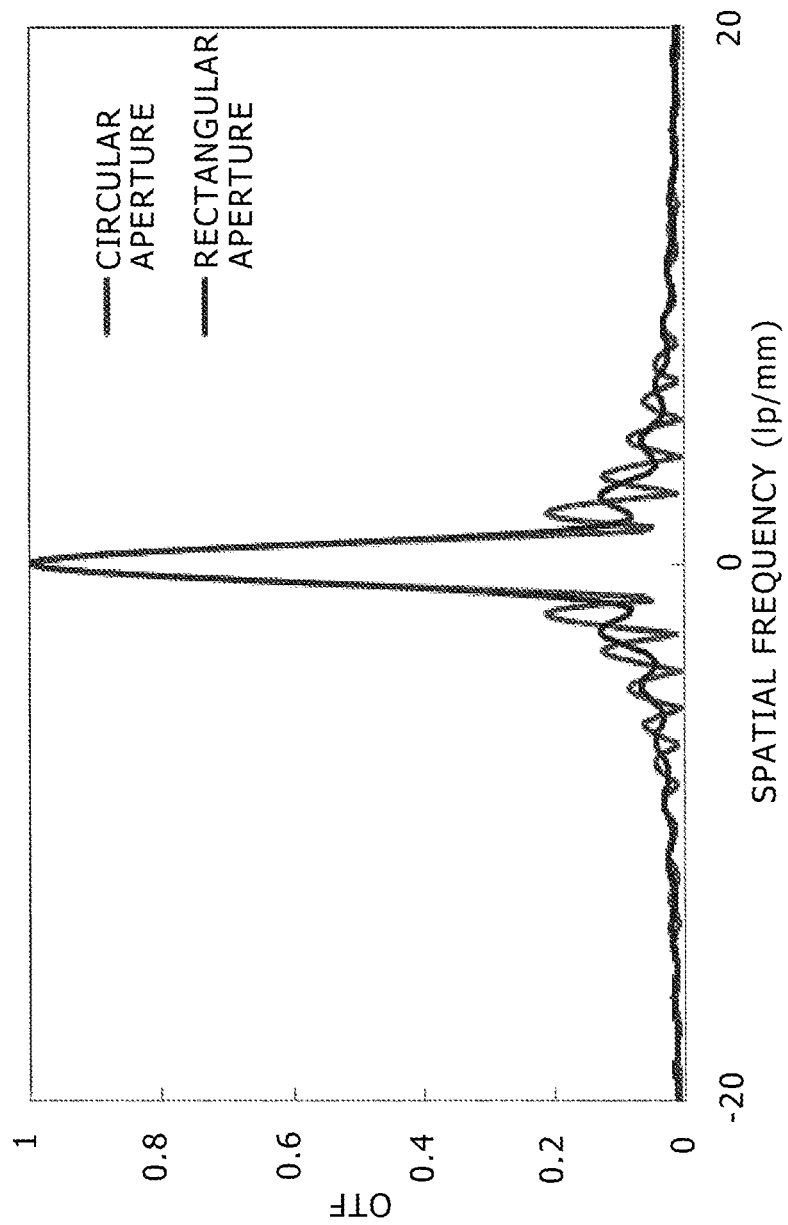
FIG. 7 is a graph showing the results from calculating the OTF in the diagonal direction for the rectangular shape and circular shape of the aperture of the diaphragm.
Figure 8A:
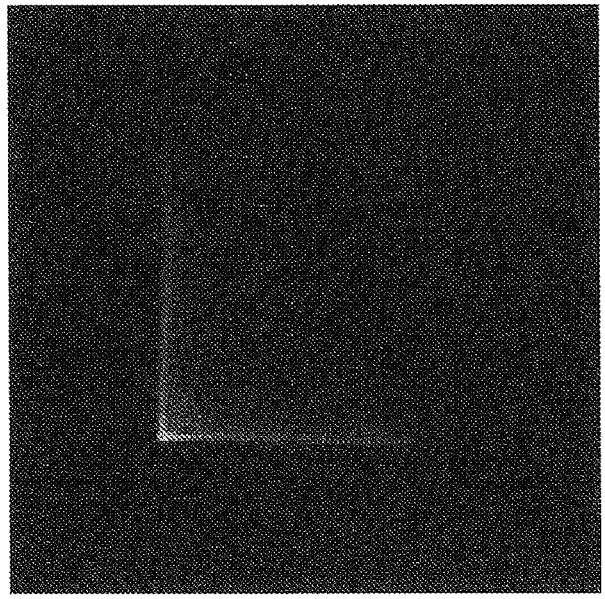
FIGS. 8A and 8B are drawings showing the results from measuring the PSF for each of the diaphragm shapes when the aperture of the diaphragm is a rectangular shape and a circular shape.
Figure 8B:
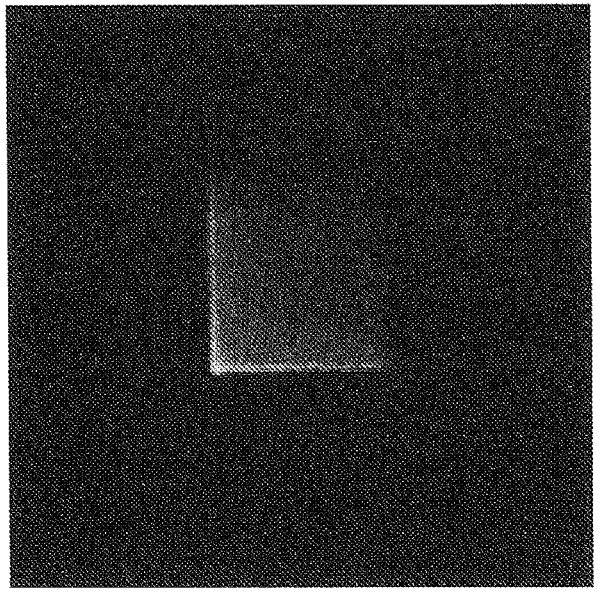

In cases where utilizing the above described cubic function phase and utilizing a typical circular diaphragm, the zero-point is generated and an artifact appears in the OTF in the diagonal direction. This phenomenon is described while referring to FIG. 7. Here, FIG. 7 shows the results from calculating the diagonal OFT for rectangular and circular apertures on the diaphragm 22. As can be seen in the figure, though no zero-point is found in the case of a rectangular aperture, there is bouncing in the circular aperture, and zero-cross occurs. FIGS. 8A and 8B give the PSF measurement results for each diaphragm shape. In contrast to the rectangular broadening as shown in FIG. 8A, the PSF for the circular diaphragm becomes an approximate triangle as shown in FIG. 8B, and the diagonal widening is limited. In order to restrict this diagonal widening, the zero-point is found for the OTF of the circular diaphragm. Utilizing a rectangular diaphragm is therefore more advantageous in wavefront coding that employs a cubic function phase plate 21 as in the present embodiment.

As shown above, utilizing the phase plate 21 having the shapes shown in FIG. 2 and FIG. 3 applies an optical transfer function that generates mostly constant "fuzziness" within a specified distance range on the optical axis in the x direction relative to the optical image of the object. However in the y direction, no such optical transfer function is applied or the extent of optical modulation is made small compared to that in the x direction. Restated in other words, a mostly constant widening of PSF (point spread function) is applied within a specified distance range on the optical axis in the x direction, however the optical axis in the y direction obtains a smaller PSF than optical axis in the x direction for the optical image of the object.

In the present embodiment, the range of filter processing in the vertical (y) direction is different from the range of filer processing in the horizontal (x) direction when performing image restoration process on the optical image input by this type of phase plate 21. Therefore in the related art, the range of filter processing in the vertical direction and range of filter processing in the horizontal direction must be made the same in order to apply nearly the same widening of the PSF in the y direction and x direction; and the number of calculations and processing time in the image restoration process, and memory for performing filter processing had to be made very large. In contrast, in the present embodiment, a smaller PSF is applied in the y direction of the optical image of the object rather than the X direction so that the range of the filter processing in the vertical direction can be narrowed, and the number of calculations and processing time in the image restoration process, and memory for performing filter processing can be reduced. Hereafter, one example of the spatial filter processor unit 6 of the present embodiment is described while referring to FIG. 4.

Figure 4:
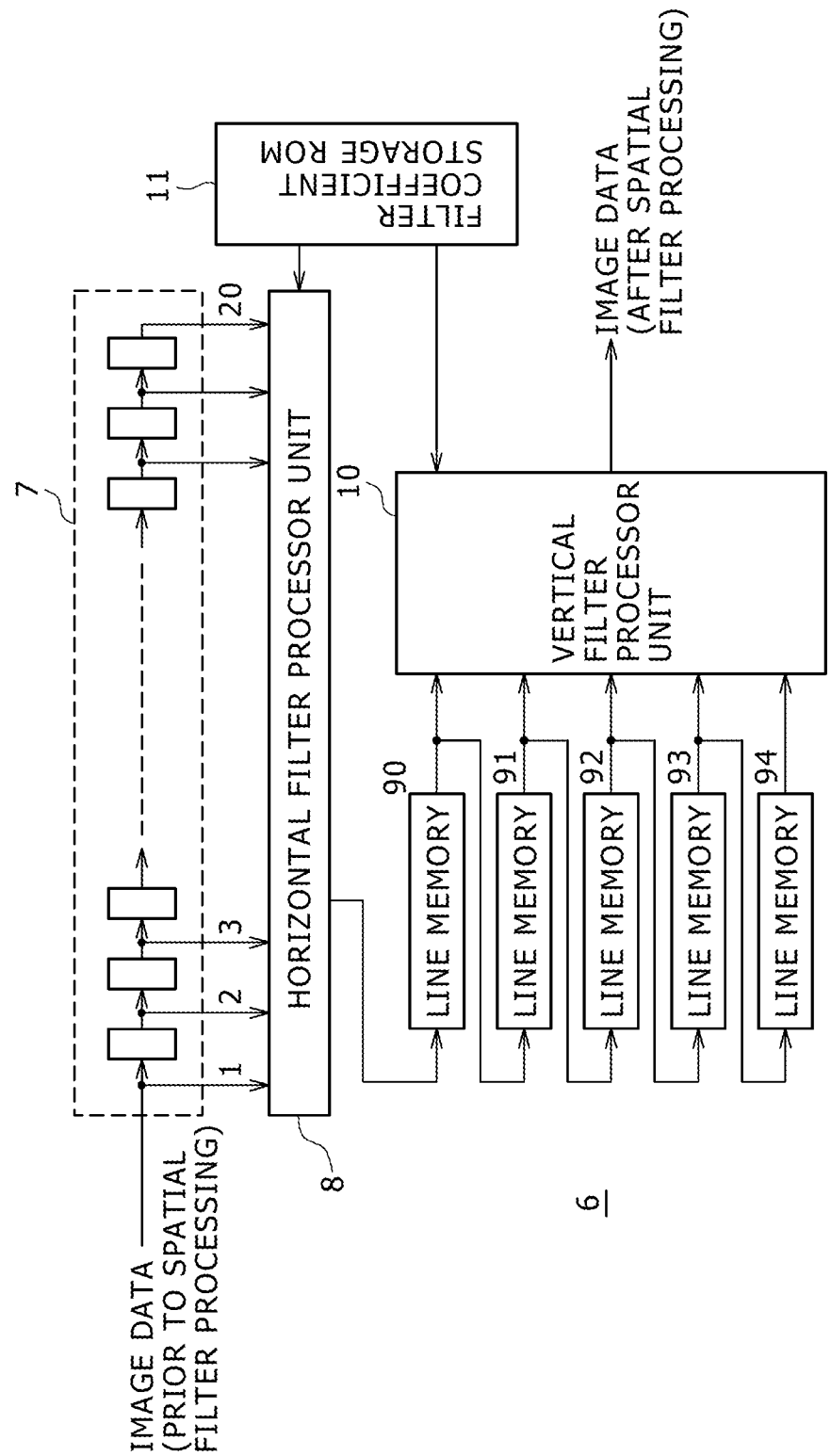
FIG. 4 is a block diagram showing one example of the structure of the spatial filter processor unit for the imaging system of the first embodiment.

FIG. 4 is a block diagram showing one example of the structure of the spatial filter processor unit 6 for the imaging system of the present embodiment. This example show a structure of the spatial filter processor unit 6 utilizing a line memory for a filter size in the vertical direction. A feature of the spatial filter processor unit 6 of the present embodiment is that the number of line memories having the task of spatial filter processing in the vertical direction is smaller than the number of taps for the shift register having the task of spatial filter processing in the horizontal direction. In the present embodiment, the spatial filter processor unit 6 includes the imaging optical system with a pupil diameter of 1.8 mm, $\lambda$=590 nm, $\alpha$=120, a focal distance f=50 mm, an object point distance of 720 mm, an image point distance of 54 mm, a pixel pitch of 6.5 μm for an imaging element 3, and the spatial filter size at this time is estimated as 20×5. In contrast, the spatial filter processor unit 6 performs spatial filter processing of 20×5 utilizing 20 pixels in the horizontal direction and 5 pixels in the vertical direction. In other words, the spatial filter processor unit 6 of this example has a horizontal filter processing range of 20 pixels, and a vertical filter processing range of 5 pixels.

Image data stored in the RAW buffer memory 5 (not shown in FIG. 4) is first of all loaded by the spatial filter processor unit 6 (or a control circuit such as a CPU not shown in the drawing) in a horizontal scan sequence and stored in the shift register 7 within the spatial filter processor unit 6. The shift register 7 contains twenty taps, and sequentially stores a specified number of pixel data (here 20 pixels) for one of the horizontal lines in each tap. The pixel data stored in each tap is output to the horizontal filter processor unit 8. The horizontal filter coefficients stored in the filter coefficient storage memory (ROM) 11 and preset corresponding to each tap in the shift register are also supplied to the horizontal filter processor unit 8. The horizontal filter processor unit 8 performs so-called convolutional arithmetic processing, or namely multiplies and sums the respective pixel data output from each of the 20 taps and the horizontal filter coefficients from the filter coefficient storage memory 11.

Here, when the pixel data for each tap is set for example as $V_1, V_2, \ldots, V_{20}$, and the horizontal filter coefficient corresponding to each tap is for example set to $k_{h1}, k_{h2}, \ldots, kh_{20}$, the convolutional arithmetic processing can be expressed for example by the following Formula 3.

$$k_{h1} \cdot V_1 + k_{h2} \cdot V_1 \ldots + K_{h20} \cdot V_{20} \qquad \text{Formula 3}$$

The horizontal filter processor unit 8 in this way implements the horizontal filtering process on the image data.

The horizontal filter processor unit 8 performs the above described horizontal filtering process on each line in one frame. The image data processed by horizontal filtering is stored in the line memories 90 to 94. In this example, five line memories 90 to 94 are utilized for storing a five line portion of horizontal filtering processed image data. A FIFO (First In-First Out) operates each line memory, and the vertical filter processor unit 10 implements the vertical filter processing at the point in time that all of the output data from the line memory is valid. Here, the image data for each line at the same horizontal position is sequentially output to the vertical filter processor unit 10 from the line memories 90 to 94. Vertical filter coefficients stored in the filter coefficient storage memory 11 and preset corresponding to each line memory are also supplied to the vertical filter processor unit 10. The vertical filter processor unit 10 multiplies and sums the pixel data of the same horizontal position output from each of the five line memories 90 to 94 by the vertical filter coefficients from the filter coefficient storage memory 11 to perform the so-called convolutional arithmetic processing. The convolutional arithmetic processing is identical to the horizontal filter processing so a description is omitted here. Vertical filter processing is in this way implemented on the vertical filter processor unit 10.

The spatial filter processor unit 6 in this way performs the filter processing on the image data loaded by the imaging element 3 in both the horizontal and vertical directions. Image restoration processing is in this way implemented to remove the "fuzziness" of the optical image to which a specific "fuzziness" was applied by the phase plate 21, and an image can be obtained that exactly matches the focusing at all positions without dependency on defocusing. A small PSF widening is applied to the optical image in the vertical direction at this time so that the range of the filter processing in the vertical direction by the spatial filter processor unit 6 can be narrowed to reduce the number of line memories.

FIG. 5 shows the simulation results for the depth of focus enlargement effects when utilizing the phase plate 21 of FIG. 2. In this figure, a certain model is utilized as the input image and a plot is made of the PSNR (Peak Signal-to-Noise Ratio), of the input image and the restored image relative to the defocusing on the imaging surface 31.

The curve (a) in the figure shows the defocus-PSNR characteristics when the cubic function coefficients in the horizontal and vertical directions required for obtaining the specified depth of focus are respectively $\alpha 1 = \alpha 2 = 60$. In this case, the range of the vertical filter increases and the number of line memories also increases. Due to limitations such as the hardware circuit scale and cost, contriving the spatial filter processor unit 6 for these cubic function coefficients is difficult.

The curve (b) in the figure shows the defocus-PSNR characteristics when the cubic function coefficients $\alpha 1$ and $\alpha 2$ in the horizontal and vertical directions in the figure are the same and when both were made smaller than the curve (a) ($\alpha 1 = \alpha 2 = 30$). In this case, the circuit scale can be reduced compared to the case of the curve (a) but the PSNR as shown in the figure exhibits a large drop compared to the curve (a).

In the present embodiment on the other hand, the curve (c) shows the defocus-PSNR characteristics when the cubic function coefficient α2 in the vertical direction is made smaller compared to the cubic function coefficient α1 and the α2 is made smaller (α1=120, α2=30) compared to the case of the curve (a). The embodiment as shown in this example can therefore acquire a PSNR that is the same as in the curve (a) shown in the figure while reducing the number of line memories. The curve in FIG. 5 shows results from a stigmatic optical system for reference.

Each structure in the curves (a) through (c) in the range capable of a PSNR equal to 40 dB or more is described here. In the case of (d) that is result of a stigmatic optical system, the PSNR reaches 40 dB when the defocus is 0.03. In the case of (b) where the cubic function coefficients are the same in the horizontal and vertical directions, when attempting to obtain a PSNR of 40 dB or more, only a defocus expanded to 0.15 can be obtained. However in (a) and (c) an expanded depth of focus is obtained with a defocus up to 0.2.1. In the case of (c) where the cubic function coefficient α2 in the vertical direction is made smaller than the cubic function coefficient α1 in the horizontal direction, the PSNR recovers to the same level as in (a) where the cubic function coefficients in both the horizontal and vertical directions are the same and large in size.

The present embodiment in this way applies different optical transfer characteristics in the horizontal direction and the vertical direction on the captured optical image, and is capable of changing the horizontal and vertical size of the spatial filters utilized in the image restoration process while reducing performance deterioration in the image restoration process such as two-dimensional spatial filtering process. The present embodiment can in this way for example reduce the number of line memories within the circuit having the task of spatial filter processing and reduce the image processing circuit scale. The present embodiment can therefore provide an imaging device at a reduced cost. The present embodiment can therefore provide an imaging device for capturing moving images that reduces the processing load and processing time in spatial filter processing, modulates the optical image and increases the depth of focus, and removes the modulation by way of the image restoration process.

The present embodiment is structured to narrow the range of the vertical filter processing more than the range of the horizontal filter processing however the embodiment may also be rendered in the structure to narrow the range of the horizontal filter processing more than the range of the vertical filter processing. However, in this case the invention makes no contribution to reducing the number of large capacity line memories so narrowing the range of the vertical filter processing is preferable.

Second Embodiment

The first embodiment utilized a phase plate 21 as an optical phase filter to apply different optical transfer characteristics in the horizontal and vertical directions of the captured optical image. However, the same effect can be obtained by way of the shape of the diaphragm 27. In other words, a feature of the present embodiment is that the diaphragm can also be utilized as an optical phase filter. This utilization is described below as the second embodiment. Aside from the structure of the optical phase filter, the structure including the internal structure of the spatial filter processor unit 6 shown in FIG. 4 is identical to the first embodiment so a detailed description is omitted here.

FIGS. 6A and 6B are drawings for describing the second embodiment of the present invention. FIG. 6A shows an example of the phase plate 26 utilized in the second embodiment having the same vertical and horizontal wavefront aberrations. FIG. 6B shows the phase plate 26 as seen via the diaphragm 27 having a rectangular aperture with an aspect ratio of 3:4. The phase plate is the same as the existing part. The aperture of the diaphragm 27 has aperture dimensions in the vertical direction that are smaller than the aperture dimensions in the horizontal direction.

The present embodiment is capable of making phase changes in the vertical direction small relative to phase changes in the horizontal direction in contour lines of wavefront aberrations of phase plate 26 (wavefront aberrations of the phase plate 26 applied by the phase plate 26) as viewed via the diaphragm 27 shape as shown in FIG. 6B even when the phase plate 26 has the same wavefront aberrations in the both the horizontal direction and vertical direction and applies largely the same optical modulation in the horizontal and vertical directions. This operation is the same as the phase plate 21 of the first embodiment shown in FIG. 2. Namely in the first embodiment, the optical phase filter is structured by utilizing the phase plate 21, but in the second embodiment a phase plate 26 that applies largely the same optical modulation in the horizontal direction and the vertical direction, and a diaphragm 27 having a rectangular aperture having a longitudinal length in the horizontal direction serve as the optical phase filter. In the present embodiment, the x, y coordinates in the cubic function shown in formula 1 may also serve as standards for the longitudinal length of the aperture pupil in the rectangle of diaphragm 27.

The aperture shape of the diaphragm 27 in the present embodiment was fixed as the above described rectangle however the aspect ratio of the rectangle may also be made variable. The filter size may also be made variable in the horizontal and/or the vertical direction of the spatial filter processor unit 6 performing the image restoration processing according to the aperture shape that was varied. The variable proportions may be set from vertical 1 to 0.5 relative to the horizontal 1.

The present embodiment can in this way easily obtain the same effect as the first embodiment by changing the shape of the aperture of the diaphragm even if utilizing a phase plate of the related art and without having to machine or process the phase plate. The shape of the diaphragm of the present embodiment was a rectangle but the shape of the diaphragm may also be an oval.

An example for the first embodiment was described in which different optical transfer characteristics were applied in the horizontal and vertical directions by changing the shape of the phase plate. An example for the second embodiment described applying different optical transfer characteristics in the horizontal and vertical directions by changing the aperture shape of the diaphragm. However, changing the phase plate and the aperture shape of the diaphragm at the same time is also permissible.

The above described embodiments of the present invention are capable of drastically shrinking or reducing the circuit scale and processing load, and processing time for performing image restoration process. The technology of the related art described such as in the U.S. Pat. No. 5,748,371 could only be utilized for capturing of still images however the present invention can be utilized not only for still images but also capturing of moving images. The present invention is therefore suitable for imaging devices of a variety of applications, for example in imaging devices including AV cameras, surveillance cameras, cellular phone cameras, portable information terminal cameras, image inspection devices, and industrial cameras for automatic control use, etc.

What is claimed is:

1. An imaging device comprising:
   an imaging element including an imaging surface;
   an optical system that includes an optical phase filter that modulates the optical transfer function of the optical image of an object and focuses an optical image modulated by the optical phase filter onto the imaging surface of the imaging element; and
   a signal processing unit that implements a two-dimensional spatial filtering process on the image focused on the imaging surface of the imaging element and implements an image restoration process in order to remove the modulation from the optical phase filter,
   wherein the optical phase filter includes a phase plate whose wavefront aberration in the horizontal direction is different from wavefront aberration in the vertical direction,
   wherein modulation characteristics applied to the optical image by the optical phase filter are different in a horizontal direction and in a vertical direction intersecting at a right angle along a flat imaging surface perpendicular to an optical axis,
   wherein the wavefront aberration of the phase plate in the vertical direction is smaller than the wavefront aberration in the horizontal direction, and
   wherein the wavefront aberration of the phase plate is expressed as:

$$f(x,y)=\alpha 1*x\hat{\,}3+\alpha 2*y\hat{\,}3$$

(where α1 and α2 indicate the coefficients, α1>α2, and x, y denote standard coordinates on the phase plate surface in which x and y intersect the optical axis).

2. The imaging device according to claim 1
   wherein the signal processing unit includes:
   a shift register utilized for implementing horizontal filter processing and includes a plurality of taps that respectively store a specified number of pixel data in one line that are optically modulated by the phase plate;
   a line memory utilized for implementing vertical filter processing and stores a plural line of image data in image data processed by horizontal filtering; and
   a filter coefficient storage memory that stores coefficients multiplied by each pixel data stored in line memory and shift register to perform the horizontal filter processing and the vertical filter processing,
   wherein the number of line memories is smaller than the number of taps of the shift register.

3. The imaging device according to claim 1,
   wherein the optical phase filter includes:
   a phase plate whose wavefront aberration in the horizontal direction and wavefront aberration in the vertical direction are approximately equivalent; and
   a diaphragm whose aperture dimension in the vertical direction is smaller than aperture dimension in the horizontal dimension.

4. The imaging device according to claim 3, comprising:
   a shift register utilized for horizontal filter processing and that includes a plurality of taps that respectively store a specified number of pixel data in one line that are optically modulated by the phase plate and the diaphragm;
   a line memory that is utilized in vertical filter processing and stores plural lines of image data in image data processed by the horizontal filter; and
   a filter coefficient storage memory that stores coefficients multiplied by each pixel data stored in the shift register and the line memory in order to perform the horizontal filter processing and the vertical filter processing,
   wherein the number of line memories is smaller than the number of taps of the shift register.

5. The imaging device according to claim 3,
   wherein aperture shape of the diaphragm is variable.

6. The imaging device according to claim 1,
   wherein the range of the filter processing in the vertical direction is smaller than the range of the filter processing in the horizontal direction.

* * * * *